(12) United States Patent
Dixon et al.

(10) Patent No.: US 7,874,604 B2
(45) Date of Patent: Jan. 25, 2011

(54) VEHICLE SLIDE-OUT ROOM DRIVE

(75) Inventors: Paul Dixon, Salmon Arm (CA); Grant Hiebert, Salmon Arm (CA); Jack Fenkhuber, Salmon Arm (CA); Loren Parfitt, Salmon Arm (CA); Steven Bradwall, Salmon Arm (CA)

(73) Assignee: Valid Manufacturing Ltd., Salmon Arm, British Columbia (CA)

( * ) Notice: Subject to any disclaimer, the term of this patent is extended or adjusted under 35 U.S.C. 154(b) by 178 days.

(21) Appl. No.: 12/213,419

(22) Filed: Jun. 19, 2008

(65) Prior Publication Data

US 2009/0033116 A1 Feb. 5, 2009

Related U.S. Application Data

(60) Provisional application No. 60/929,254, filed on Jun. 19, 2007.

(51) Int. Cl.
*B60N 99/00* (2006.01)
(52) U.S. Cl. ........................... 296/26.13; 52/67
(58) Field of Classification Search ............ 296/156, 296/164, 165, 171, 172, 173, 175, 176, 26.01, 296/26.12, 26.13, 168; 52/67, 72, 71, 64, 52/79.5, 79.12, 79.1
See application file for complete search history.

(56) References Cited

U.S. PATENT DOCUMENTS

| | | | |
|---|---|---|---|
| 3,850,470 A * | 11/1974 | Trelle | 296/175 |
| 5,860,686 A | 1/1999 | Tiedge | |
| 6,170,903 B1 | 1/2001 | Crean | |
| 6,325,437 B2 * | 12/2001 | Hiebert et al. | 296/26.01 |
| 6,428,073 B1 | 8/2002 | Blodgett, Jr. | |
| 6,536,821 B1 | 3/2003 | Gardner | |
| 6,568,734 B2 * | 5/2003 | Buls et al. | 296/26.12 |

(Continued)

FOREIGN PATENT DOCUMENTS

WO PCT/US01/27651 3/2002

OTHER PUBLICATIONS

U.S. Appl. No. 11/088,227, filed Oct. 13, 2005, Schneider.

(Continued)

*Primary Examiner*—Patricia L Engle
*Assistant Examiner*—SunSurraye Westbrook
(74) *Attorney, Agent, or Firm*—Antony C. Edwards

(57) ABSTRACT

An apparatus for moving a slide-out compartment of a vehicle. The slide-out compartment is slidably received in an opening in the side of the vehicle. The apparatus includes a rotatable member having a distal end wherein the rotatable member is rotatably mounted to one of the slide-out or the opening so as to rotate the member about a horizontal axis parallel to a first plane substantially containing the opening. A drive rotates the rotatable member. A slotted bearing portion is mounted to the other one of the slide-out or the opening. Rotation of the rotatable member causes the distal end to bear against so as to slide along the slot in the bearing portion to selectively extend or retract the slide-out compartment relative to the vehicle. The rotatable member and drive may be mounted adjacent to the opening in the vehicle wherein the bearing portion is mounted in an end wall of the slide-out.

25 Claims, 15 Drawing Sheets

U.S. PATENT DOCUMENTS

| | | |
|---|---|---|
| 6,729,670 B1 | 5/2004 | Buls et al. |
| 6,796,590 B2 | 9/2004 | Schneider |
| 6,896,307 B2 * | 5/2005 | Nye et al. ............... 296/26.01 |
| 7,011,351 B1 | 3/2006 | Crean |
| 7,175,219 B1 | 2/2007 | Blodgett, Jr. |
| 2005/0179278 A1 * | 8/2005 | Yoder ...................... 296/26.13 |
| 2006/0076798 A1 * | 4/2006 | Kunz ......................... 296/175 |

OTHER PUBLICATIONS

U.S. Appl. No. 10/988,483, filed Aug. 18, 2005, Yoder.

* cited by examiner

VEHICLE SLIDE-OUT ROOM DRIVE

CROSS REFERENCE TO RELATED APPLICATION

This application claims priority from U.S. Provisional Patent Application No. 60/929,254 filed Jun. 19, 2007 entitled Vehicle Slide-Out Room Drive.

FIELD OF THE INVENTION

This invention relates to devices for expanding the useable space within a vehicle and in particular to a method and apparatus for extending and retracting slide-out compartments for vehicles.

BACKGROUND OF THE INVENTION

It is known that the interior space of vehicles such as buses and recreational vehicles, or RV's as they are known in the art, is limited by the exterior dimensions of the vehicle and in particular the width of the vehicle. In many cases the width of the vehicle is limited by a maximum allowable width for vehicles traveling on conventional roadways. As an example, in some jurisdictions, the width of recreational vehicles is limited to approximately 8½ feet. However, when the vehicle has been parked, it is desirable to enlarge the useable interior space of the recreational vehicle beyond the maximum vehicle width allowable during use of the vehicle on the roadways.

One method to enlarge the useable space of the RVs is to provide an extendable compartment that has an exterior wall which is co-planar with the side wall of the RV for transportation. Such extendable compartments, known as slide-outs, may be extended relative to the RV when the vehicle has been parked. Slide-outs are typically slidably supported within an opening in a side wall of the RV and include one or more hydraulic cylinder, jack screw or rack and pinion mechanisms located below or along the sides of the slide-out for moving the slide-out between its extended and retracted positions. Examples of such slide-outs may be found in U.S. Pat. Nos. 6,796,590 to Schneider, 6,170,903 to Crean, 6,428,073 to Blodgett, Jr., 6,536,821 to Gardner, 5,860,686 to Tiedge, 6,325,437 to Hiebert, and 6,729,670 to Buls et al for example.

As owners have required larger living spaces in their RVs designers have responded by designing and building longer slide-out compartments. Such slide-out compartments may be 21 feet or more in length and have weights of 3000 pounds or more. A difficulty with building slide-outs of this length is the deflection of the middle portion of the slide-out when in the extended position. It will be appreciated that it is necessary to seal the opening of the RV around the slide-out both when the slide-out is extended as well as when the slide-out is retracted for transportation. Accordingly excessive deflection of the middle portion of the slide-out may cause the middle portion of the slide-out to rub against and damage the seal or may create too large of a gap between the wall of the RV and the slide-out to effectively seal due to the need to provide clearance for the deflection between these two components. Although support for the middle portion of the slide-out may help to reduce the amount of deflection, such intermediate support of the slide-out frequently interferes with the slide-out drive systems previously employed.

An additional difficulty with locating a drive mechanism for the slide-out below the slide-out compartment is the potential for water and debris to foul or otherwise damage the slide-out drive. However, previous slide-out drives have dictated this location due to the transverse length requirements of such system. In many RVs, there is limited or no space below the floor of the RV to contain such a drive mechanism.

An additional challenge in moving slide-outs in and out of RVs is that as the slide-outs get larger, and to accommodate the desire to extend slide-outs outwardly the maximum distance which may be obtained when constrained by the width of the RV, the drive mechanisms cantilever further and further outwardly from the slide-out support structure within the RV and those become increasingly unstable. In particular, the more pivotably inter-connected linkage members in a drive linkage and the greater the distance the linkage has to extend so as to extend the slide-out, the greater the tendency for the drive linkage to be "wobbly", that is sufficiently unstable so that the slide-out may translate fore and aft relative to the RV (using the example of a slide-out in the side wall of an RV) during extension and during use of the slide-out while in its extended position.

As a general proposition, in applicant's view the greater the number of linkage members and pivoting connections in a drive linkage, the greater the tendency for the slide-out to wobble or shake when in its fully extended position so as to potentially adversely affect for example the seals around the slide-out. Thus it is one object among other objects of the present invention to provide a simplified drive mechanism and linkage to a single rotary drive and single linkage arm, whether unitary or telescopic, at each end wall and in mid-walls as necessary.

The method and apparatus of the present invention will thus minimally obstruct the end wall and will also enable a minimally obstructive support and drive apparatus to be located at a middle portion of the slide-out for greater support and load capacity.

SUMMARY OF THE INVENTION

According to a first embodiment of the present invention there is disclosed an apparatus for moving a slide-out compartment of a vehicle. The slide-out compartment is slidably received in an opening in the side of the vehicle. The apparatus comprises a rotatable member having a distal end wherein the rotatable member is rotatably connectable to one of the slide-out or the opening about what in a preferred embodiment is a horizontal axis parallel to a first plane substantially containing the opening, which may be parallel to the longitudinal direction of the vehicles. A second plane containing the axis of rotation of the rotatable member may be parallel to a direction of travel of the slide-out compartment.

The apparatus further comprises a drive motor for rotating the rotatable member and a bearing portion connectable to the other one of the slide-out or the opening. Rotation of the rotatable member causes the distal end to bear against the bearing portion so as to selectively extend or retract the slide-out compartment relative to the vehicle.

The rotatable member and drive motor may be locatable adjacent to the opening in the vehicle wherein the bearing portion is locatable in an end wall of the slide-out. The bearing portion may include a slot.

The rotatable member is rotatable between an extended and a retracted position on a path of travel substantially on a single side of the second plane. In one embodiment the path of travel may be an arc of at least 180 degrees. Where the arc exceeds 180 degrees, for example 190-200 degrees, advantageously the arc extends through the second plane. In one embodiment this provides an "over-center" lock releasably locking the rotatable member at the ends of its travel.

The drive motor may be selected from the group consisting of an electric motor, a pneumatic motor or a hydraulic motor. The drive may further comprise at least one reduction gear. The rotatable member may be a linkage arm rotated by the drive.

The bearing portion may comprise a pivotal connection at a distal end of the rotatable member. The rotatable member may be longitudinally extendable, for example telescopic. The rotatable member may be pivotally connected to the opening of the vehicle. The drive may further comprise a cam follower mounted on a drive gear and received within a drive slot on the rotatable member.

According to a further embodiment of the present invention there is disclosed a method for moving a slide-out compartment of a vehicle. The slide-out compartment is slidably received in an opening in the side of the vehicle. The method comprises providing a rotatable member having a distal end wherein the rotatable member is rotatably connectable to one of the slide-out or the opening about an axis parallel to the longitudinal direction of the vehicle. The method further comprises rotating the rotatable member so as to cause the distal end to bear against the bearing portion so as to selectively extend or retract the slide-out compartment relative to the vehicle.

In summary, the apparatus for moving a slide-out compartment according to one aspect of the present invention may be characterized as including at least two end drives, wherein each end drive includes a single driving linkage arm having opposite first and second ends, a stationary vehicle-mounting frame mountable to the vehicle, a translatable slide-out mounting frame mountable to the slide-out compartment, wherein the linkage arm is pivotally mounted at its first and second ends to the slide-out mounting frame and the vehicle mounting frame respectively for actuating sliding-out translation in a slide-out direction of the slide-out mounting frame relative to the vehicle mounting frame upon rotation about an axis of rotation of the linkage arm relative to both the mounting frames.

A rotational drive motor is provided for driving only the single linkage arm to thereby selectively actuating the rotation of the linkage arm. The rotational drive motor directly and only provides a torsional force to actuate the rotation of the linkage arm. Upon actuation the linkage arm rotates in an arc in a substantially vertical plane containing the arc. The arc is parallel to the slide-out direction so as to be mountable substantially into an end wall of the slide-out compartment.

In a preferred embodiment the arc is symmetric in the substantially vertical plane about the first end of the linkage arm so that the translation in the slide-out direction extends substantially equal distances on opposite sides of the axis of rotation.

In one embodiment, the slide-out mounting frame includes a slotted member. A follower is mounted on said first end of the linkage arm and cooperates with a slot in the slotted member so as to move along the slot as the linkage arm rotates in its arc. The slide-out frame translates in the slide-out direction between a retracted position retracted into the opening and an extended position extended from the opening as the follower moves between first and second opposite ends of the slot. In a preferred embodiment, in the extended position the linkage arm is substantially horizontal so as to position the follower at an elevation substantially common with an elevation of the axis of rotation.

The slot may be substantially linear and substantially vertical, and the slotted member is mounted substantially vertically on the slide-out frame. Further, the linkage arm may be substantially linear.

The drive motor may be mounted to the vehicle mounting frame, and may include a transmission, so as to include a reduction gear, cooperating between the motor and the linkage arm.

In a selectively lockable embodiment, the arc may be greater than 180 degrees. For example, the arc may be in a range of substantially 190-200 degrees. Advantageously, 180 degrees of the arc are orthogonal to, and on a first side for example an upper side of, a horizontal plane containing the axis of rotation and wherein the second end of the arm over-rotates about the axis of rotation so as to over-rotate to a second side for example a lower side opposite to the first side of the horizontal plane containing the axis of rotation. The over-rotation thereby releasably locks said slide-out mounting frame when the arm is over-rotated to the second side.

In the embodiment employing a slotted member and follower, when said arc is greater than 180 degrees the linkage arm may be over-rotated by an over-center rotation to an end of the arc so as to move the follower into engagement in a distal end of the first end of the slot whereby the follower is releasably locked in the distal end and of the slot the slide-out frame is thereby releasably locked in its corresponding position.

In one embodiment, the linkage arm may be pivotably mounted to the vehicle mounting frame at the second end of the linkage arm, and wherein the slot may be at least as long as the linkage arm.

In different embodiments, the linkage arm may be unitary, or it may be telescopic. Where the linkage arm is telescopic, the linkage arm may include first and second telescopic sections. A first telescopic section may be pivotably mounted to the slide-out mounting frame. A second telescopic section may be pivotably mounted to the vehicle mounting frame. The first and second telescopic sections may be telescopically mounted to one another.

In one aspect of the present invention, the first telescopic section includes at least one cam follower and the second telescopic section includes a cammed slot. The cam follower is slidably mounted in the cammed slot. The at least one cam follower is adapted to maintain the first and second telescopic sections linearly aligned relative to one another during telescopic movement of the first telescopic section relative to the second telescopic section. This may be achieved by an elongate cam follower or where the at least one cam follower is a plurality of cam followers.

The rotary drive motor may be mounted to the vehicle mounting frame and to a base end of the second telescopic section. The arc may be substantially 90 degrees or more.

Other aspects and features of the present invention will become apparent to those ordinarily skilled in the art upon review of the following description of specific embodiments of the invention in conjunction with the accompanying figures.

DETAILED DESCRIPTION OF EMBODIMENTS OF THE INVENTION

The following description is to be read in conjunction with a review of FIGS. 1-12 as described above wherein similar characters of reference denote corresponding parts in each view.

Figure 1:
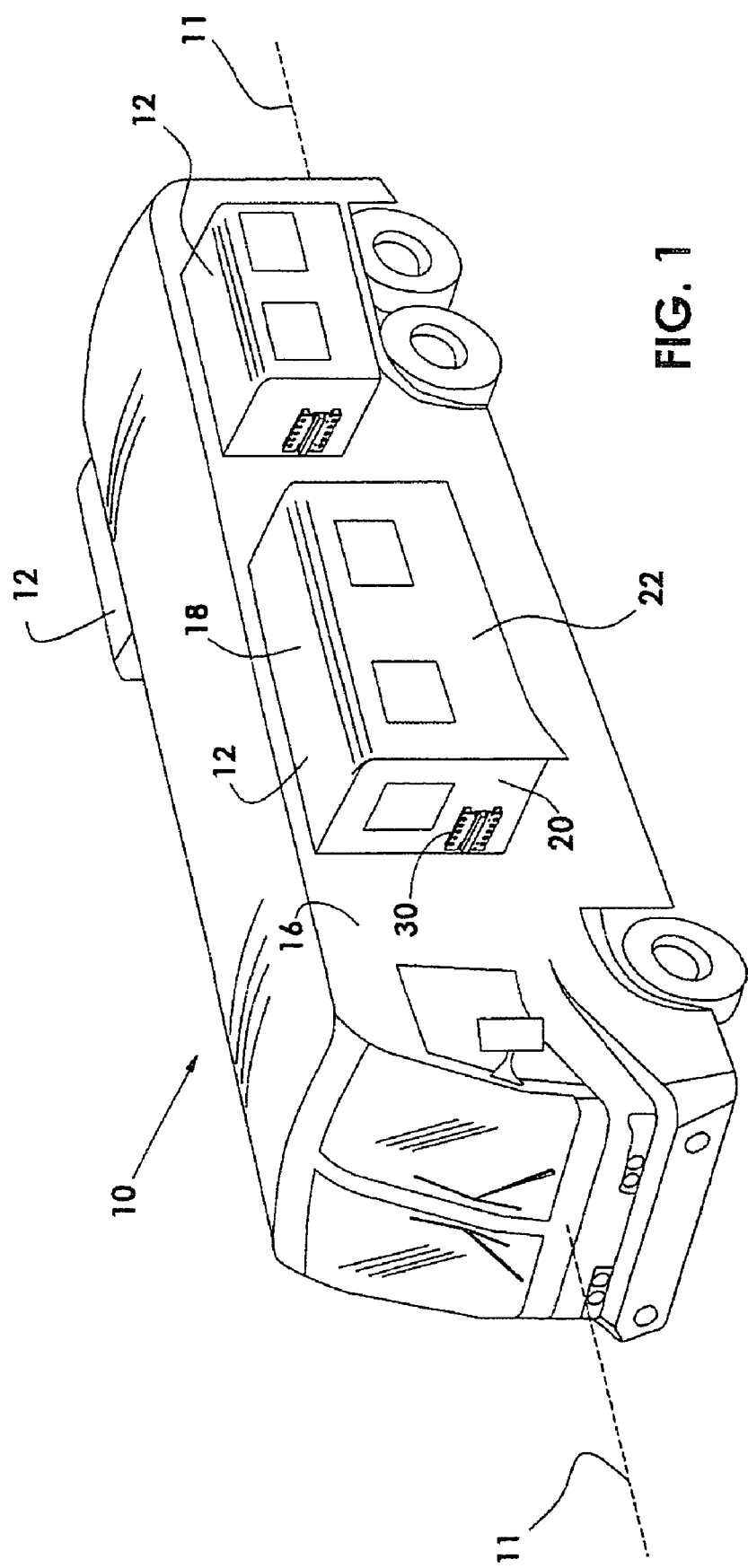
FIG. 1 is a perspective view of a vehicle having incorporated therein slide-out compartments illustrated in the fully outwardly extended position.
Figure 2:
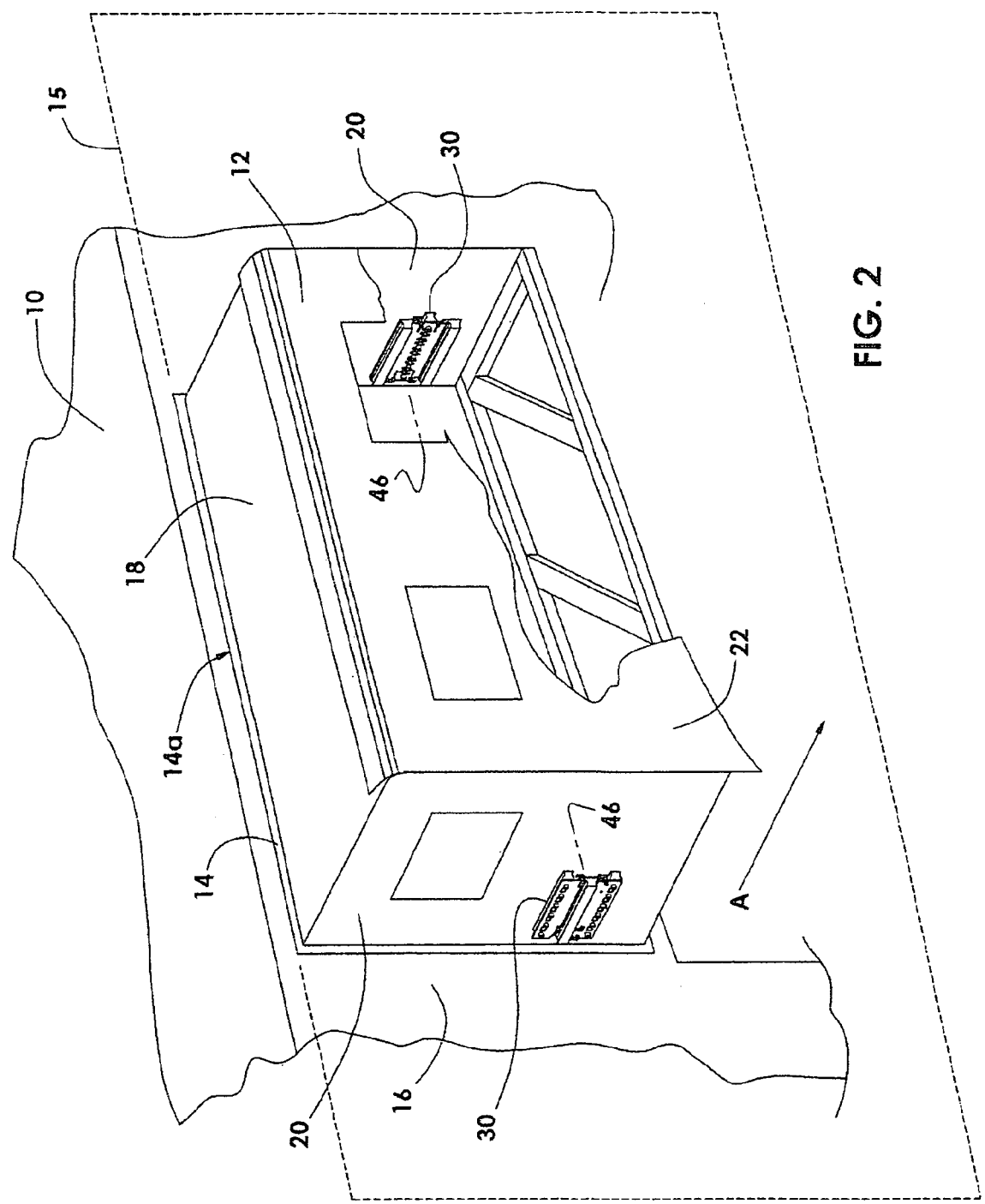
FIG. 2 is an enlarged partially broken away perspective view of the larger slide-out compartment of FIG. 1 in a partially extended position and having an end-wall drive according to a first embodiment of the present invention.

A vehicle 10 incorporating fore and aft slide-out room compartments 12 is illustrated in FIGS. 1 and 2. Vehicle 10 may be, without limitation, a bus, coach, recreational vehicle or trailer or the like (collectively referred to herein as an RV). Although two slide-out compartments are illustrated, this is not intended to be limiting as one or more slide-out compartments in any one vehicle are intended to fall within the scope of the invention. Vehicle 10 has a longitudinal axis 11 and pair of longitudinally extending side walls 16.

Slide-out compartments 12 are normally retracted so as to be generally flush with the side walls 16 of the vehicle when the vehicle 10 is in motion. Once the vehicle is parked, slide-out compartments 12 may be translated laterally outwardly in direction A from the vehicle side walls 16 to expand the interior living space of the vehicle. Slide-out compartments 12 are laterally slidable within an opening 14 formed within, and lying substantially in a plane 15 (shown diagrammatically in dotted outline) containing, the side wall 16 of the vehicle or such other wall as manufacturers may consider advantageous in which to mount a slide-out compartment. Each slide-out compartment 12 may have a roof 18, opposed end walls 20, a side wall 22 and floor 24 which enclose an interior living space. Side wall 22 of slide-out compartment 12 may be generally parallel to side wall 16 of the vehicle. The perimeter 14a of wall opening 14 is formed or adapted so as to provide a weather seal against the exterior surfaces of slide-out compartments 12.

Slide-out compartments 12 may have frames fabricated from stainless steel or other structurally rigid, relatively light weight material. The lateral translation within opening 14 of slide-out room compartment 12 in direction A, and in a direction opposite to direction A, that is, in a direction orthogonal to side walls 16, is accomplished by use of slide-out support and drive mechanisms 30.

Figure 3:
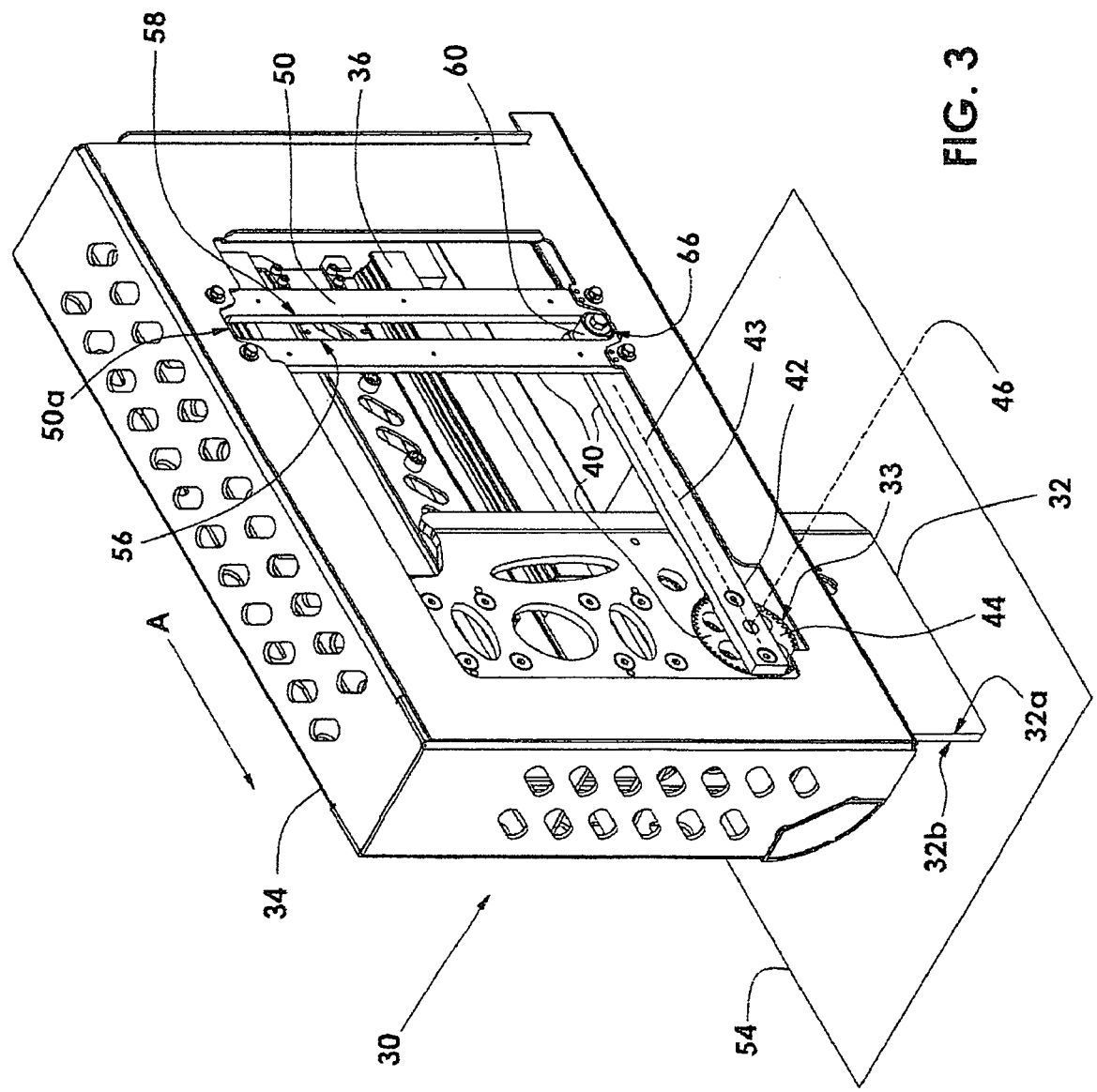
FIG. 3 is a perspective view of the end wall drive of FIG. 2 with the slide-out compartment at a fully retracted position.
Figure 4:
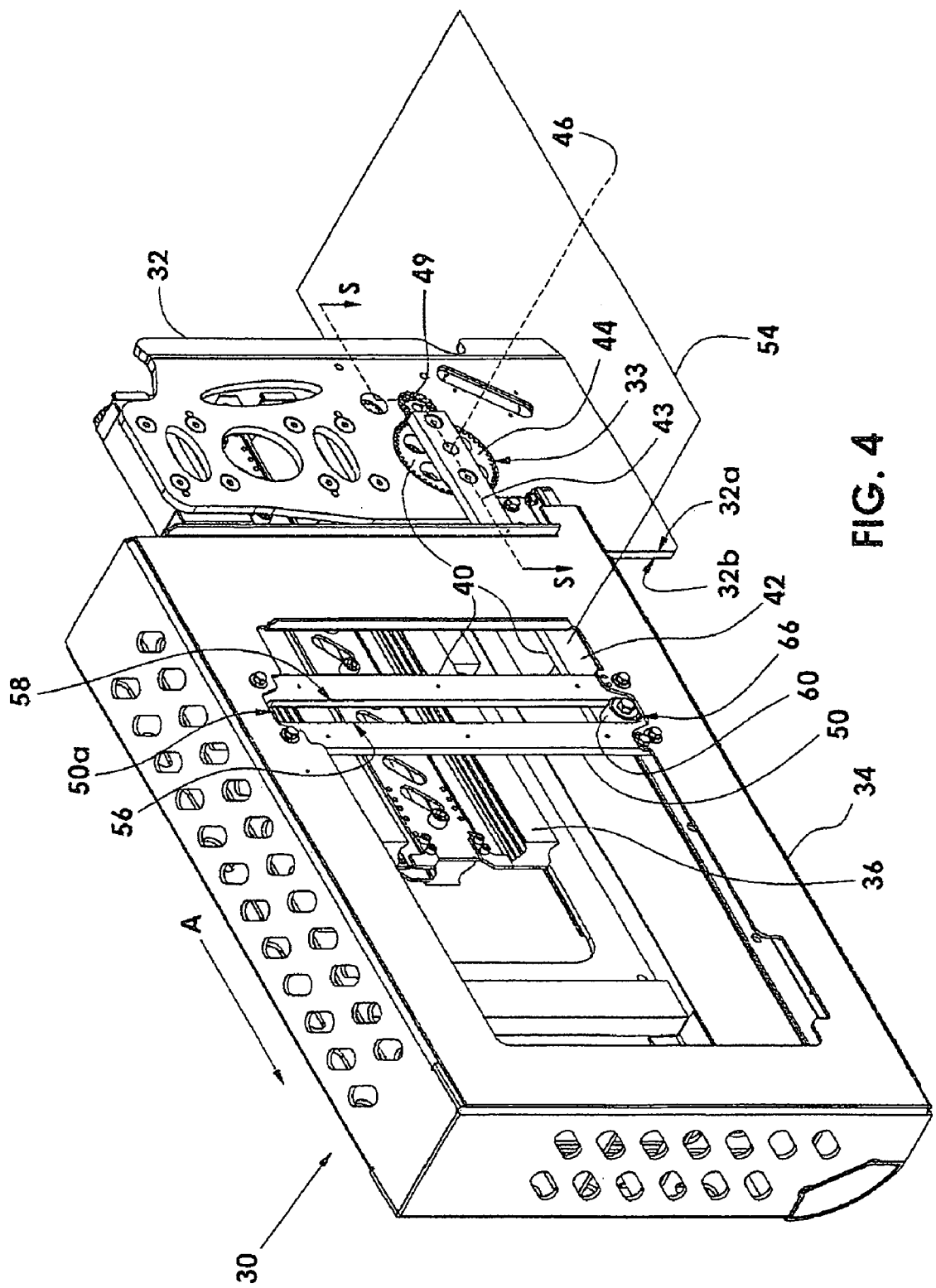
FIG. 4 is a perspective view of the end wall drive of FIG. 2 with the slide-out compartment at a fully extended position.

Turning now to FIGS. 3 and 4, a slide-out support and drive mechanism 30 according to a first embodiment of the present invention is illustrated without the RV or slide-out compartment. Although, the slide-out support and drive mechanism illustrated in FIGS. 3 and 4 is for a right hand side of the slide-out compartment when viewed in the direction A as shown in FIG. 2, it will be appreciated that the left hand side of the slide-out compartment will include an identical but mirrored slide-out support and drive mechanism. One or more intermediate slide-out support and drive mechanism may also be incorporated for supporting and driving the slide-out compartment at one or more intermediate positions between the two end wall slide-out support and drive mechanisms. FIG. 3 illustrates the slide-out support and drive mechanism 30 in a retracted position wherein the slide-out compartment is in an retracted position suitable for transportation. FIG. 4 illustrates the slide-out support and drive mechanism 30 in an extended position wherein the slide-out compartment is in an extended position.

The slide-out drive and support mechanism 30 comprises fixed frame 32 securable to the RV and a moveable frame 34 securable to the slide-out compartment 12 with a linear bearing assembly 36 for supporting moveable frame 34 relative to the fixed frame 32 and a drive assembly 40 therebetween. The linear bearing assembly 36 is conventional in the art. An example of a linear bearing assembly 36 is shown in Applicant's U.S. Pat. No. 6,325,437 incorporated herein by reference. The moveable frame 34 is secured within or to an end wall 20 of a slide-out compartment 12. The fixed frame 32 is secured adjacent to the opening 14 such that the fixed frame 32 through the linear bearing assembly 36 slidably supports the slide-out compartment 12 within the opening 14.

Figure 5:
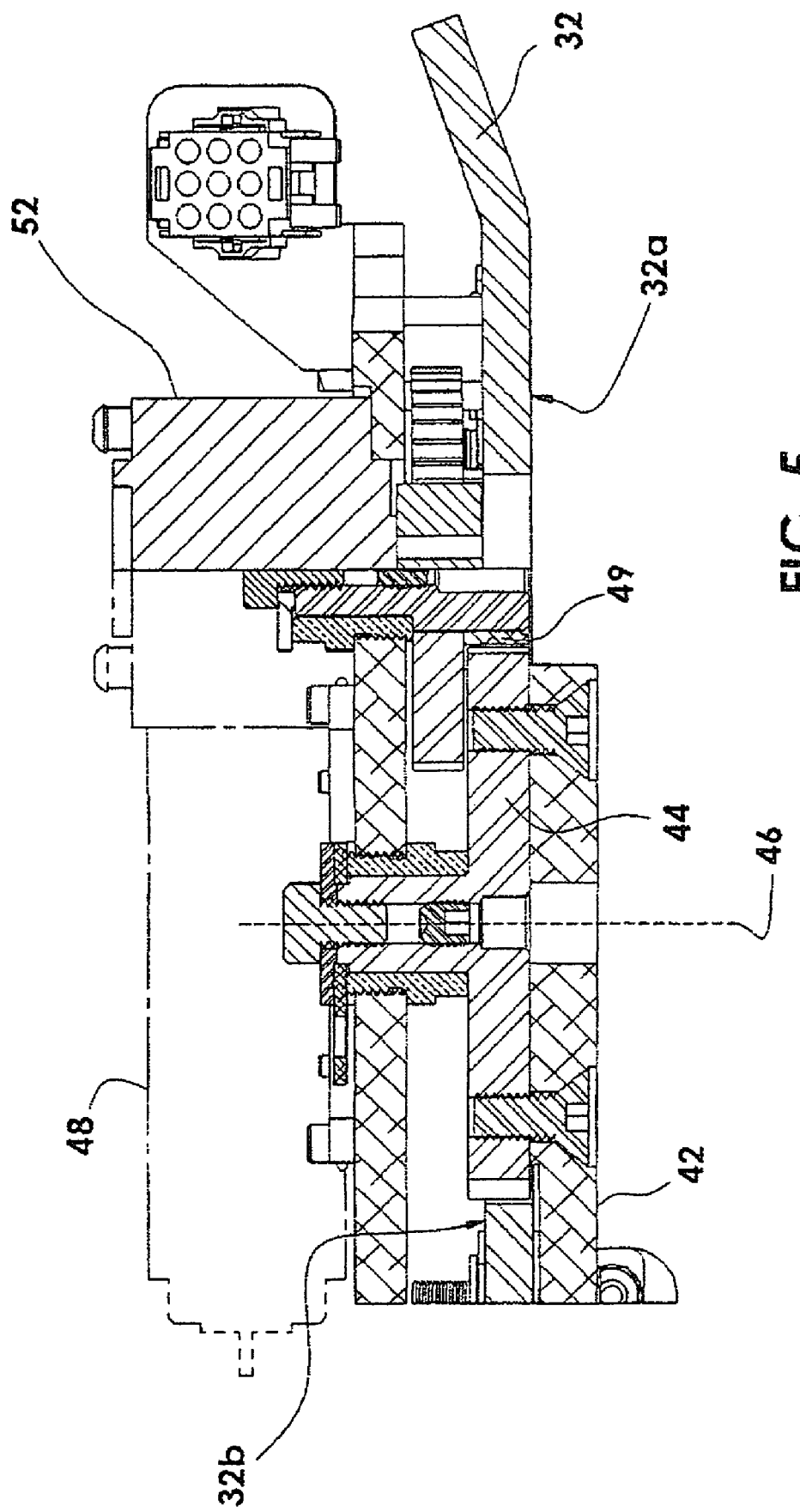
FIG. 5 is a jogged cross-section view of the end wall drive along line 5-5 in FIG. 4.

The drive assembly 40 comprises a crank arm 42 supported on a driven gear 44, and cooperating with a crank slot 50a in guide 50. Guide 50 is mounted on moveable frame 34 so as to align slot 50a vertically. The crank arm 42 comprises an elongate rigid member having a longitudinal axis 43. Crank arm 42 is fixedly secured to and rotatable with driven gear 44. The driven gear 44 is rotatable about an axis 46 and is driven by an electric or other type of motor 48 (shown in dotted outline in FIG. 5) through one or more reducer gear 49. Plane 54 is parallel to the direction of travel A of the slide-out compartment 12. Axis 46 is contained within plane 54. The driven gear 44 and the reducer gear 49 are located in an opening 33 in the fixed frame 32. The crank arm 42 is located to a first side 32a of fixed frame 32. As seen in FIG. 5, the electric motor 48 and a speed reducing gear box 52 are secured to a second side 32b of the fixed frame 32. The speed reducing gear box 52 drives the reducing gears 49 at a reduced speed relative to the electric motor 48.

The crank arm 42 includes a roller 60 at a distal end thereof which is slidably secured within the slot 50a of guide 50. The guide 50 comprises first and second parallel spaced apart slot guide surfaces 56 and 58, respectively. Slot 52a and guide 50 are aligned substantially perpendicular to plane 54.

Figure 6:
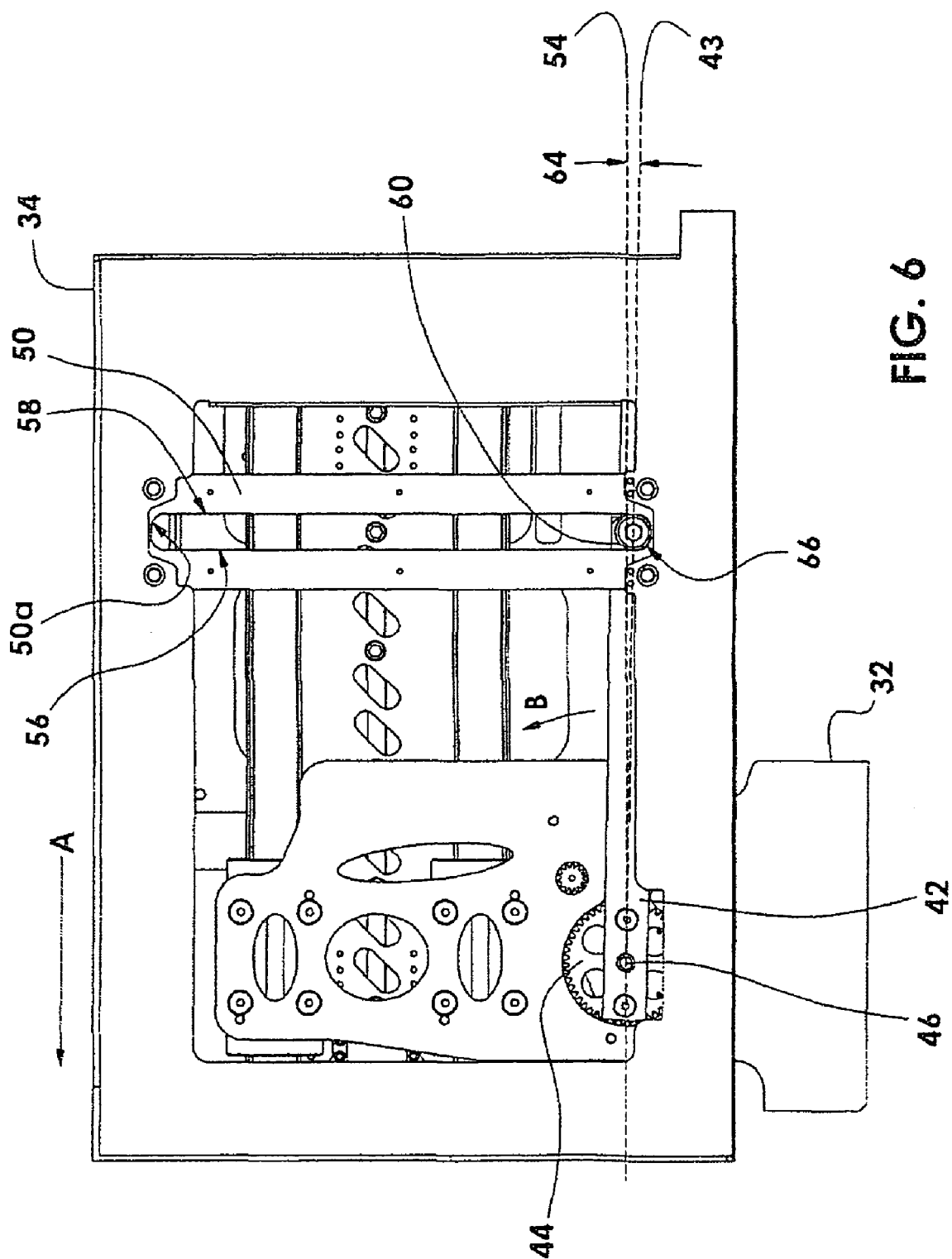
FIG. 6 is a side elevation view of the end wall drive of FIG. 2 with the slide-out compartment at a fully retracted position.
Figure 7:
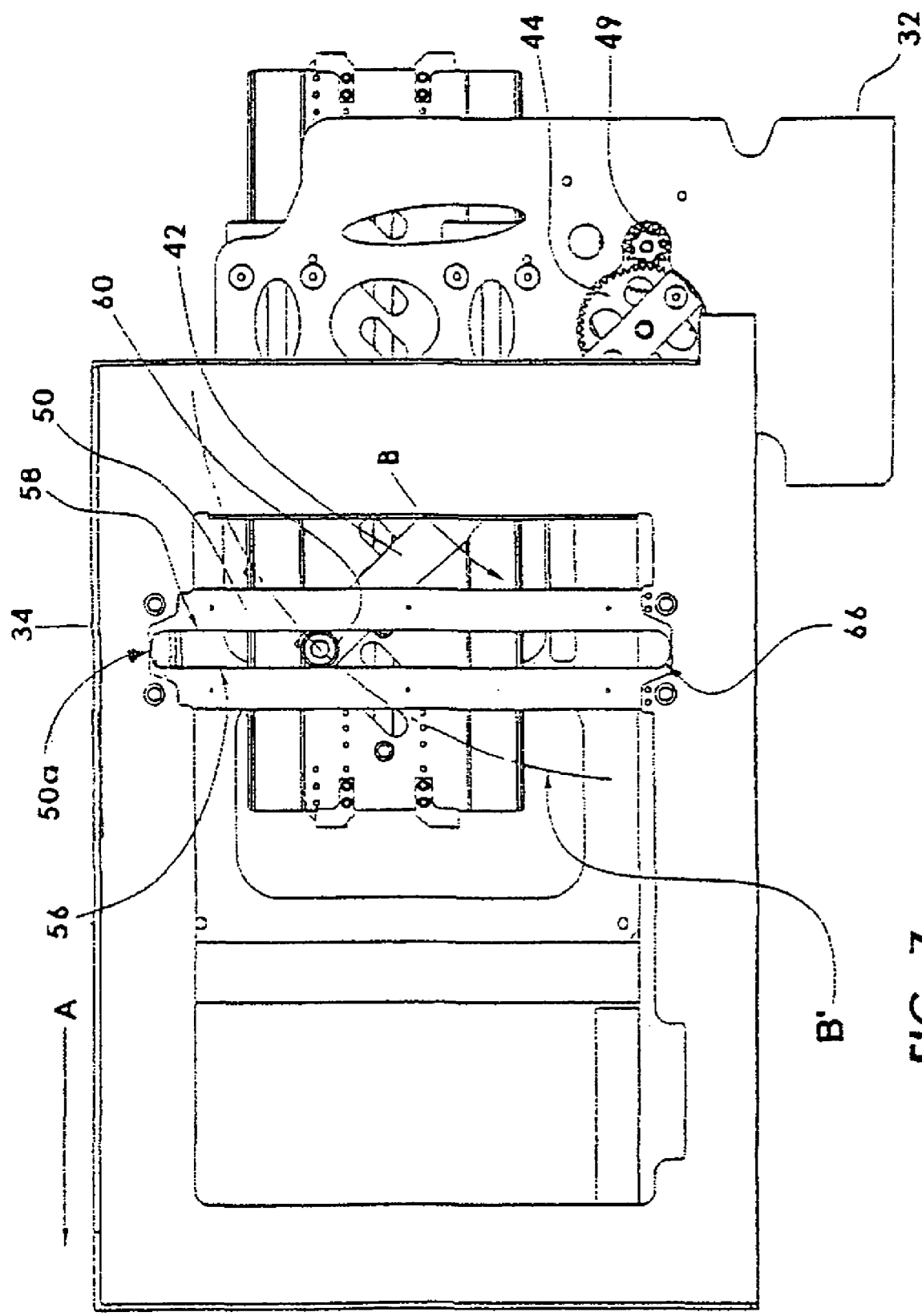
FIG. 7 is a side elevation view of the end wall drive of FIG. 2 with the slide-out compartment at a partially extended position.
Figure 8:
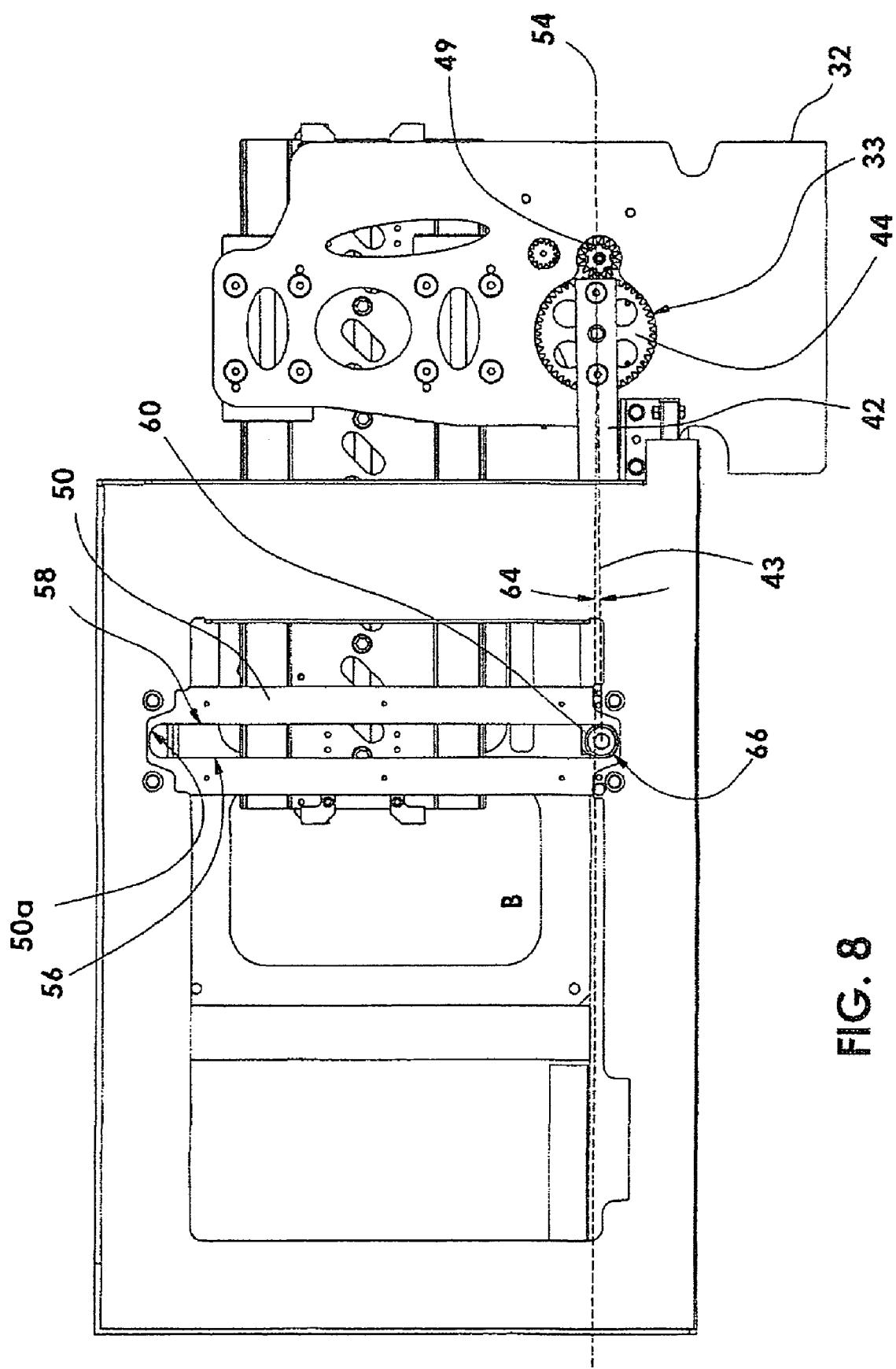
FIG. 8 is a side elevation view of the end wall drive of FIG. 2 with the slide-out compartment at a fully extended position.

Turning now to FIGS. 6 through 8, the movement of the crank arm 42 relative to the fixed frame 32 is illustrated at several rotational positions along a sequence of moving movable frame 34, and hence the slide-out compartment 12, from a fully retracted position as shown in FIG. 6, through a partly extended position shown in FIG. 7, to a fully extended position as shown in FIG. 8. Rotation of the driven gear 44 and thereby the crank arm 42, and corresponding torsional force B, causes the follower, the roller 60, to travel in a corresponding circular arc B' having a center at axis 46. The circular movement of the roller 60 simultaneously causes the roller 60 to bear against the first slot guide surface 56 as well as to displace the roller along slot 50a. The bearing of the roller 60 against the first guide surface 56 causes the first guide surface as well as the guide 50, the moveable frame 34 and therefore the slide-out compartment 12 to be translated in direction A. It will be appreciated that rotation in a direction opposite to direction B causes the slide-out compartment 12 to be retracted as the roller 60 bears against the second slot guide 58 so as to return frame 34 in a direction opposite to direction A. Although in the illustrated embodiment arc B is above plane 54, it will be appreciated however that the crank arm may also be rotated below plane 54.

Figure 12:
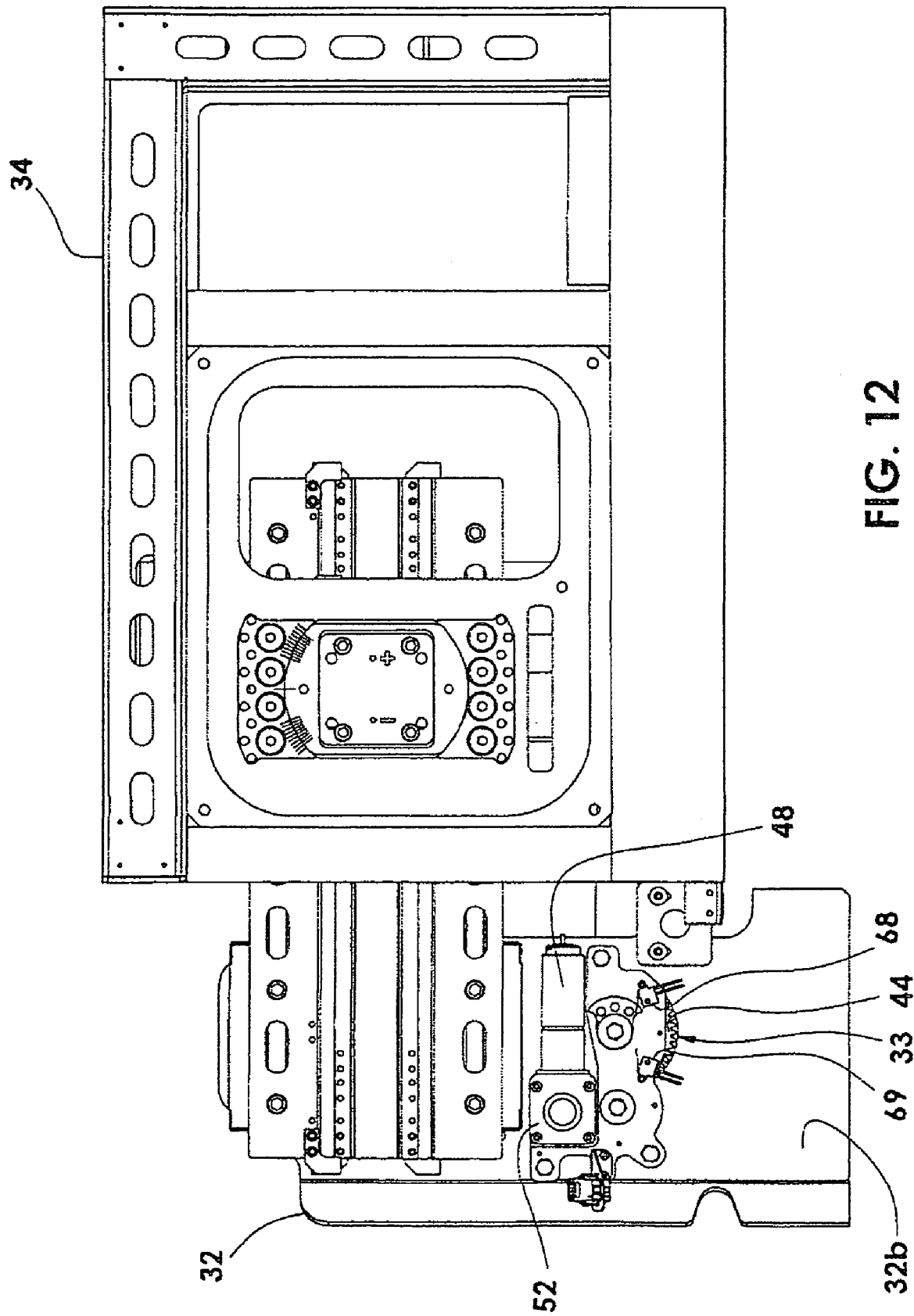
FIG. 12 is a side elevation view of the end wall drive of FIG. 2 showing the positions of extension and retraction limit switches.

As illustrated in FIGS. 6 and 8, slot 50a is sufficiently long so that crank arm 42 may be over-rotated slightly past, that is, through plane 54 by angle 64. This over-rotation by angle 64 selectively locks crank arm 42 in an over-center position relative to plane 54 so as to snug roller 60 into an over-center pocket or extended end 66 of slot 50a to thereby resist inadvertent upward vertical movement of roller 60 in slot 50a in the event of a lateral force, for example a wind gust, acting on the slideout compartment so as to urge it into its retracted position. The seating of roller 60 in end 66 thus selectively locks the slide-out compartment 12 in either its extended or retracted positions. That is, in the locked position, any impacts or external forces exerted upon the slide-out compartment 12 will only urge the roller 60 downwardly against the bottom end 66 of the slot 50a. The drive assembly 40 may also include one or more extension limit switch 68 and retraction limit switch 69, the operation and position of which will be further explained below. As illustrated in FIG. 12, the extension limit switch and retraction limit switch may be located on the fixed frame 32 and may correspond to the retracted and extended positions of the crank arm 42 or driven gear 44.

Figure 9:
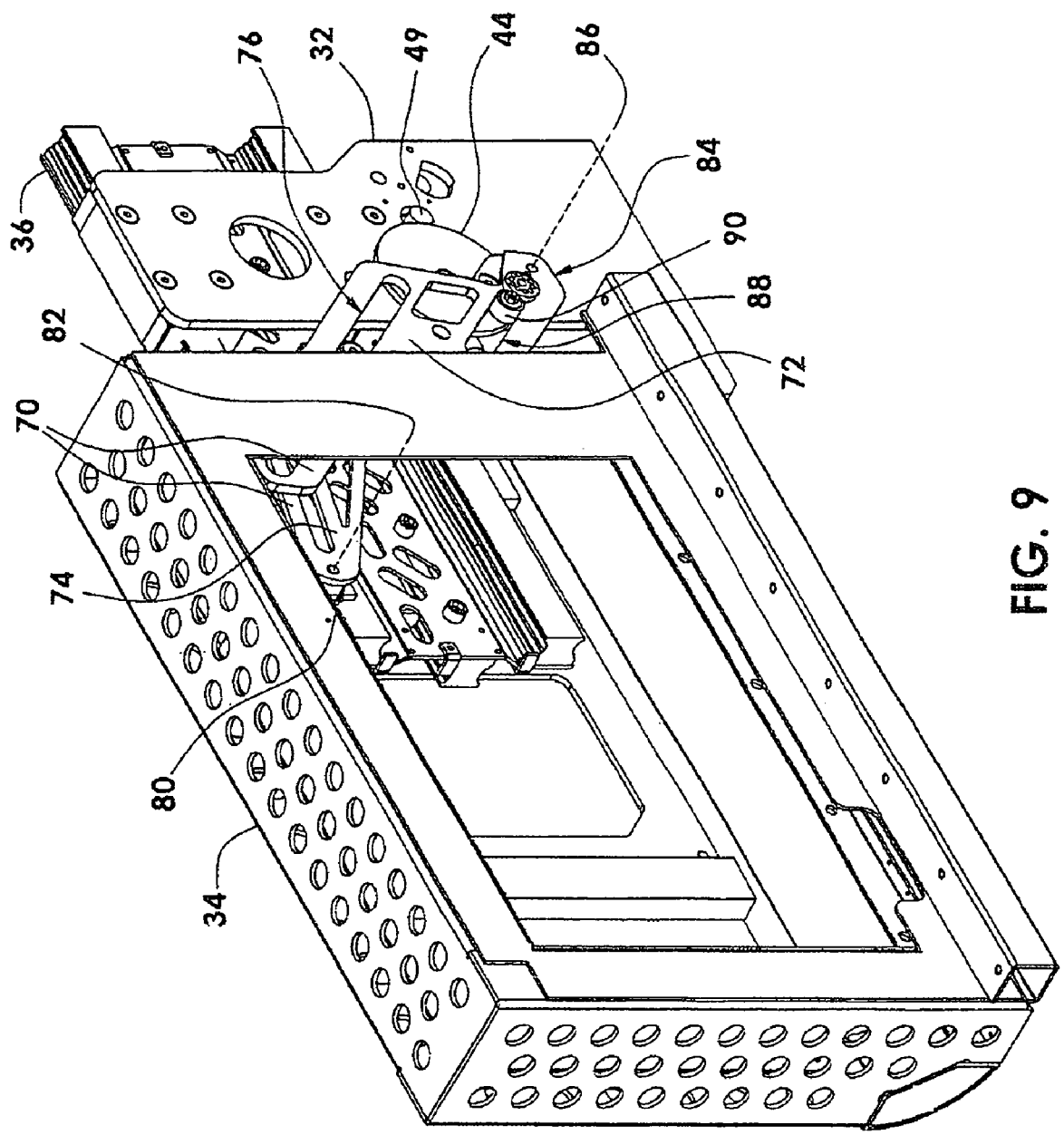
FIG. 9 is a perspective view of an end wall drive according to a further embodiment of the present invention at a fully extended position.
Figure 9A:
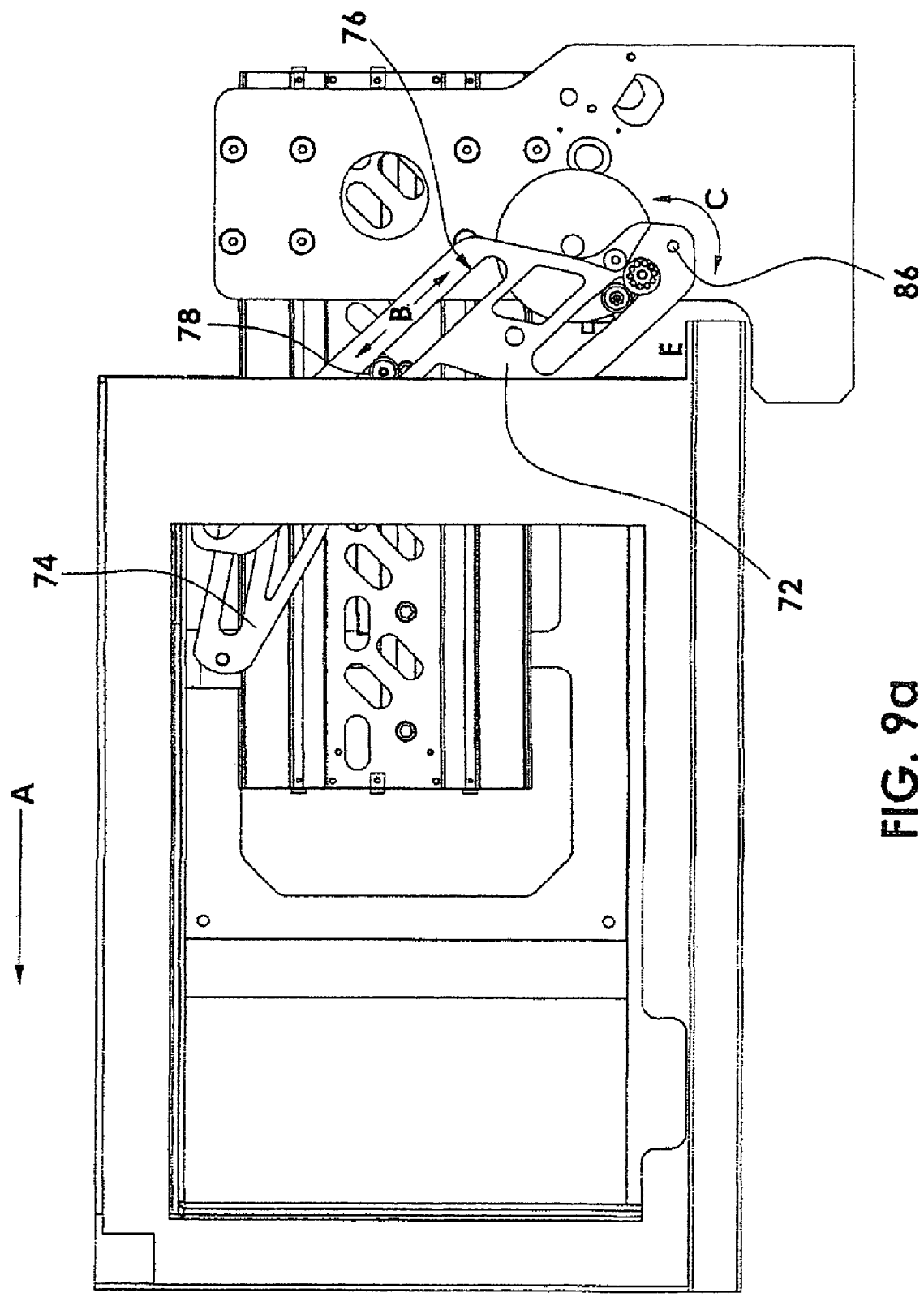
FIG. 9a is the drive of FIG. 9 in right side elevation view.
Figure 10:
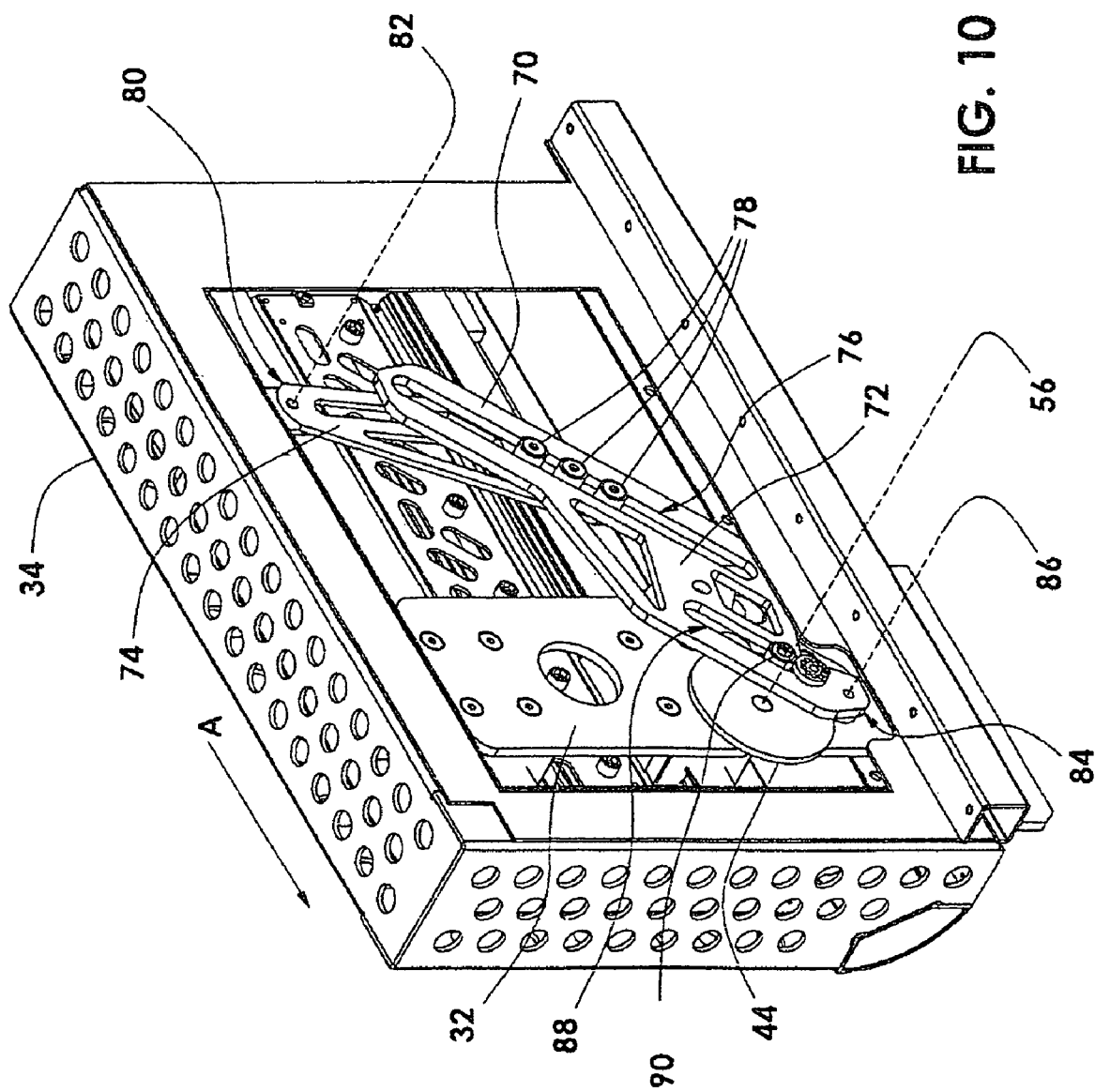
FIG. 10 is a perspective view of the end wall drive of FIG. 9 at a fully retracted position.

Turning to FIGS. 9-10, an alternative embodiment of the present invention is shown having a telescopically extendable crank arm 70. The extendable crank arm 70 comprises first and second arm sections 72 and 74, respectively. The first aim sections 72 includes an extension slot 76 aligned with the axial length of the crank arm. The second arm section 74 includes at least two alignment rollers 78 mounted within the extension slot 76 so as to maintain the lengthwise alignment of the first and second arm sections. The second arm section 74 includes a distal end 80 which is pivotally connected to the moveable frame at first pivot 82. The first arm section 72 includes a proximate end 84 which is pivotally connected to the fixed frame 32 at second pivot 86. The first arm piece also includes a crank slot 88. According to this embodiment, the driven gear 44 includes a crank roller 90 pivotally connected to a side surface of the driven gear at an eccentric distance from the axis 46 of the driven gear. The crank roller 90 is received within the crank slot 88 such that rotation of the driven gear 44 about its axis of rotation 46 will rotate the crank roller driving the crank roller along the crank slot between its upper end 88a and adjustable lower stop 91 and therefore cause the extendable crank arm 70 to rotate about the second pivot 86 about its rotational arc. As the moveable frame 34 moves in direction A from the fully retracted position shown in FIG. 10 to an extended position, the alignment rollers 78 permit the second arm section 74 to move longitudinally relative to the first arm section by being displaced in direction B along extension slot 76. Thus as may be seen in this embodiment, which is not intended to be limiting, the rotation in direction C of arm 70 covers an arc of approximately 90 degrees about pivot 86.

Figure 9B:
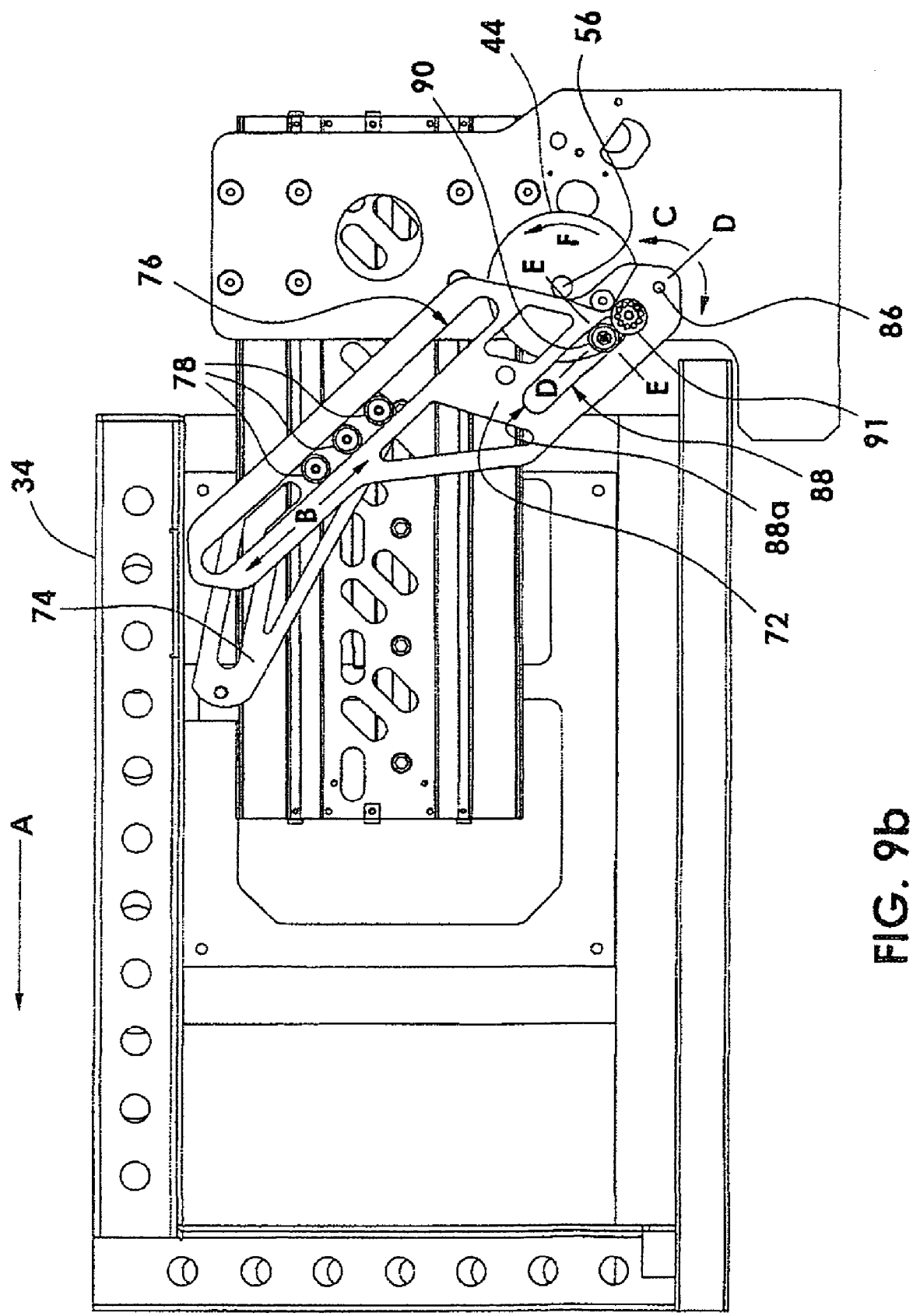
FIG. 9b is the view of FIG. 9a with a cover removed to show the telescopic linkage arm more clearly.

As crank roller 90 rotates downwardly towards stop 91, it travels along pane D-D which bisects slot 88 as seen in FIG. 9b. As plane E-E, which is orthogonal to plane D-D and passes through the center of crank roller 90, translates downwardly through axis of rotation 46 of driven gear 44, arm 72 mechanically locks. That is, as plane E-E passes downwardly with the rotation in direction F of roller 90 downwardly along slot 88 (plane D-D), once plane E-E passes downwardly through axis rotation 46, a force exerted on movable that is slide-out frame 34 in a direction opposite to direction A would urge roller 90 downwardly against stop 91. At that point roller 90 has been over-rotated or over-center rotated so as to selectively lock frame 34 in its extended position.

Figure 10A:
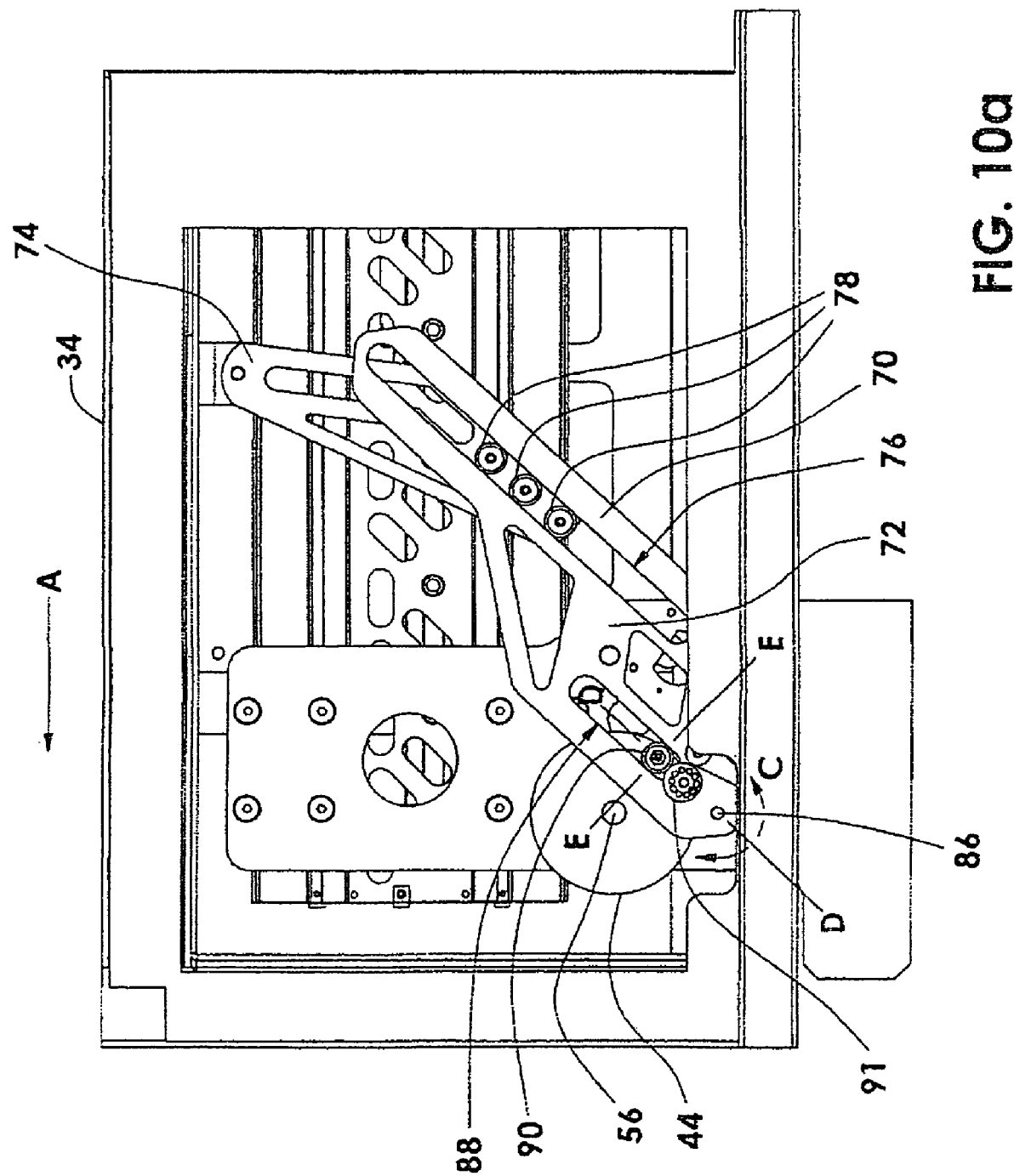
FIG. 10a is the drive of FIG. 10 in right side elevation view.

Upon the same principle, as seen in FIG. 10a, when frame 34 is fully retracted so as to over-center rotate roller 90 downwardly in a direction opposite to direction F against stop 91, a force urging frame 34 in direction A will urge roller 90 further against stop 91. That is, the over-center rotation selectively locks frame 34 in its fully retracted position.

A slide-out compartment 12 may utilize a slide-out drive and support mechanism 30 at each end of the slide-out compartment. In addition, for longer slide-out compartments one or more slide-out drive and support mechanisms 30 may be utilized at intermediate locations between the ends of the slide-out compartment. The motors of each of the slide-out drive and support mechanisms 30 utilized in a slide-out compartment may be synchronized so that the slide-out compartment 12 is maintained parallel to the vehicle 10 so as to prevent binding or bearing wear. Current sensors may be utilized to sense when one or more of the motors have encountered an obstacle.

Figure 11:
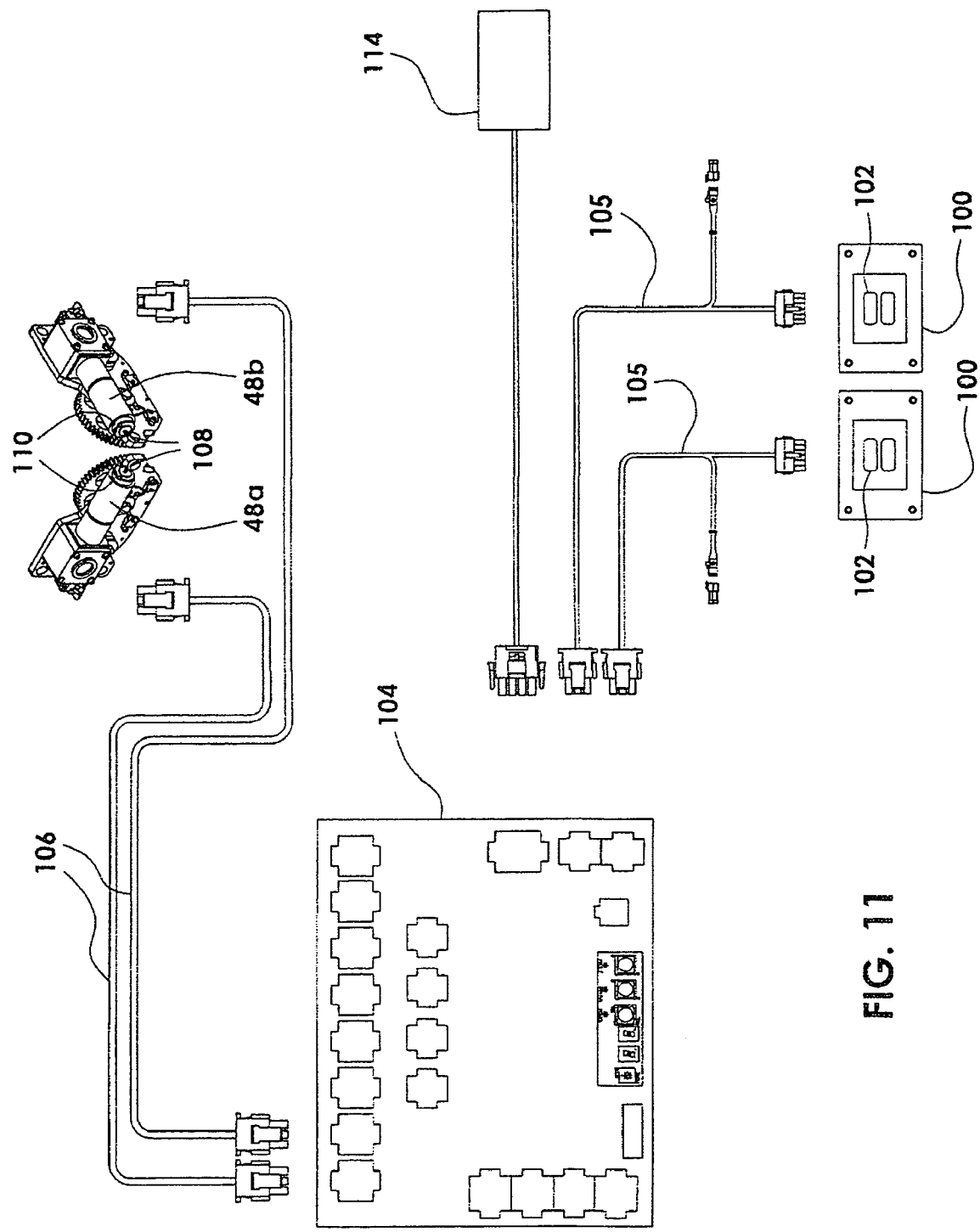
FIG. 11 is a block diagram of the slide-out drive control system according to one aspect of the present invention.

With reference to FIG. 11, in operation, a user (not shown) presses the extension button 102 on at least one control panel 100 which may be located within the interior of the RV 10. Control panel 100 transmits an extension signal to the slide-out controller 104 through control wires 105. The control panel provides the first and second electric motors 48a and 48b, respectively with power through motor lines 106. The electric motors 48a and 48b each have an output shaft 108 which includes an encoder 110 or rotary sensor for providing a signal representing position and speed of the output shaft of the electric motors to the controller 104 through encoder wires in the motor lines 106. The encoders or sensors 110 may provide one or more analog signals representing speed and position of the output shafts 108 to the controller. The encoders 110 may also provide a digital signal to the controller representing the speed and position of the output shafts 108. As illustrated, the power supply for the controller 104 is a battery 114, although it will be appreciated that other power sources such as the RV alternator, a generator set or any other suitable power source could be utilized. Although two electric motors 48a and 48b are illustrated in FIG. 11, it will be appreciated that more than two electric motors may also be utilized without deviating from the operation of the present system.

The controller 104 utilizes the data signals from the encoders 110 of each of the electric motors 48a and 48b to determine which of the electric motors are lagging in position. Controller 104 sets a target value representative of motor's position wherein the target value is set to correspond to a position at a pre-determined, configurable distance in advance of the position of the lagging motor. The power supplied to the lagging electric motor is set to maximum while the power supplied to each of the remaining electric motors is adjusted utilizing pulse width modulation to cause each of the electric motors to advance to the target position while being constrained to a maximum distance from the lagging electric motor. The controller 104 includes a configurable current trip limiter (not shown) for each electric motor 48a and 48b. When the current for any of the electric motors rises above a predetermined limit, which indicates that an obstacle has been encountered by the slide-out compartment 12 or the slide-out compartment has reached the fully extended or retracted positions, controller 104 will stop all of the electric motors.

As previously indicated, the drive assembly 40 includes limit switches. According to a preferred embodiment such as illustrated in FIG. 12 the drive assembly will include an extension limit switch 68 and a retraction limit switch 69 for each of the electric motors 48a and 48b. The extension and retraction limit switches 68 and 69 are located along the path of travel of the crank arm 42 or the moveable frame 34 and may be located, for example, on the linear bearing assembly 36 as illustrated in FIGS. 3 and 4. The positions of the extension and retraction limit switches 68 and 69 are selected to correspond to the end portion of the movement of the crank arm or slide-out in the extending or retracting directions. By way of non-limiting example, the extension and retraction switches 68 and 69 may be located to correspond to the final 10 percent of travel of the crank arm in the extension direction for the extension limit switch 68 and to the final 10 percent of travel of the crank arm in the retraction direction for the retraction limit switch 69. The extension and retraction limit switches 68 and 69 provide a signal to the controller 104 through limit switch wires located in the motor lines 106 when the crank arm or slide-out enters the final portion of travel. Upon receipt of a limit switch signal by the controller 104, the current trip limit is reduced. By way of non-limiting example, the default current trip limit may be set at 10 amps. After the controller has received a limit switch signal, the current trip limit may be reduced to 2 amps.

During retraction or extension, while a limit switch is engaged, the above procedure is used, however, the controller does not stop all of the electric motors 48a and 48b when one of the electric motors reaches the current trip limit. Rather all of the electric motors 48a and 48b are operated until all of the electric motors have reached the current trip limit. This position will correspond to the fully retracted or extended position of the slide-out. When in the retracted position, the controller then initializes this location as the base location utilizing the data at this location from the encoders 112.

Thus, as compared to the prior art of which applicant is aware, various aspects of the present invention offer advantages over the prior art. For example, and as described above, the drive mechanism uses rotary motion, versus linear motion in the prior art, to move the slide-out. The simplified mechanism allows the drive mechanism and linkage arm to be primarily contained within the slide-out end wall. For use with longer slide-outs, a mid-wall may also be provided with a drive mechanism according to the present invention. Advantageously, the drive mechanisms in the slide-out are synchronized electronically rather than mechanically.

The rotary motion drive, or rotary drive, combined with only the use of a single linkage arm, whether unitary or telescopic, provides a significant simplification over the four bar linkage used in the prior art. A linear bearing supports and controls the horizontal motion of the slide-out. In preferred embodiments the slide-out may be positively locked by over-rotation past the horizontal position in the primary rotational arc of the linkage arm during movement of the slide-out in its fully extended or fully retracted into its docked position.

Further advantageously, in at least one embodiment of the present invention, the drive system is symmetric in that the linkage arm rotates to both sides of the rotary drive advantageously in a symmetric arc about the rotary drive. In one embodiment the arc is at least 180 degrees, and may be approximately an arc of 190-200 degrees to provide the locking over-rotation of 5-10 degrees beyond horizontal.

As will be apparent to those skilled in the art in the light of the foregoing disclosure, many alterations and modifications are possible in the practice of this invention without departing from the spirit or scope thereof.

What is claimed is:

1. An apparatus for moving a slide-out compartment when the compartment is slidably mounted in an opening in a vehicle, and wherein the apparatus includes at least two end drives, each end drive comprising:
   a single driving linkage arm having opposite first and second ends,
   a stationary vehicle mounting frame mountable to the vehicle,
   a translatable slide-out mounting frame mountable to the slide-out compartment,
   wherein the linkage arm is pivotally mounted at said first and second ends to said slide-out mounting frame and said vehicle mounting frame respectively for actuating sliding-out translation in a slide-out direction of said slide-out mounting frame relative to said vehicle mounting frame upon rotation about an axis of rotation of said linkage arm relative to both said mounting frames,
   a rotational drive motor driving only said single linkage arm for selectively actuating said rotation of said linkage arm, wherein said rotational drive motor directly and only provides a torsional force to actuate said rotation of said linkage arm,
   and wherein said linkage arm rotates in an arc in a substantially vertical plane containing said arc wherein said arc is parallel to said slide-out direction so as to be mountable substantially into an end wall of the slide-out compartment.

2. The apparatus of claim 1 wherein said arc is symmetric in said substantially vertical plane about said first end of said linkage arm so that said translation in said slide-out direction extends substantially equal distances on opposite sides of said axis of rotation.

3. The apparatus of claim 2 wherein said slide-out mounting frame includes a slotted member having a slot, and wherein a follower is mounted on said first end of said linkage arm and cooperates with said slot so as to move along said slot as said linkage arm rotates in said arc, and wherein said slot has opposite first and second ends, and wherein said slide-out frame translates in said slide-out direction between a retracted position retracted into the opening and an extended position extended from the opening, and wherein as said follower moves between said first and second ends of said slot said slide-out frame translates between said retracted and extended positions, wherein in said extended position said linkage arm is substantially horizontal so as to position said follower at an elevation substantially common with an elevation of said axis of rotation.

4. The apparatus of claim 3 wherein said slot is substantially linear.

5. The apparatus of claim 4 wherein said slot is substantially vertical.

6. The apparatus of claim 5 wherein said slotted member is mounted substantially vertically on said slide-out frame.

7. The apparatus of claim 6 wherein said linkage arm is substantially linear.

8. The apparatus of claim 3 wherein said drive motor is mounted to said vehicle mounting frame.

9. The apparatus of claim 8 wherein said drive motor further comprises a transmission cooperating between said motor and said linkage arm.

10. The apparatus of claim 9 wherein said transmission includes a reduction gear.

11. The apparatus of claim 2 wherein said arc is greater than 180 degrees, and wherein 180 degrees of said arc is orthogonal to, and on a first side of, a horizontal plane containing said axis of rotation and wherein said second end of said arm over-rotates about said axis of rotation so as to over-rotate to a second side opposite to said first side of said horizontal plane containing said axis of rotation to thereby releasably lock said slide-out mounting frame when said arm is said over-rotated to said second side.

12. The apparatus of claim 3 wherein said arc is greater than 180 degrees and said linkage arm is over-rotated by an over-center rotation to an end of said arc so as to move said follower into engagement in a distal end of said first end of said slot whereby said follower is releasably locked in said distal end and said slide-out frame thereby releasably locked in a corresponding position.

13. The apparatus of claim 11 wherein said first side is an upper side.

14. The apparatus of claim 12 wherein said slot is substantially vertical.

15. The apparatus of claim 14 wherein said slot is substantially linear.

16. The apparatus of claim 11 wherein said arc is in the range of substantially 190-200 degrees.

17. The apparatus of claim 12 wherein said arc is in the range of substantially 190-200 degrees.

18. The apparatus of claim 3 wherein said linkage arm is pivotably mounted to said vehicle mounting frame at said second end of said linkage arm, and wherein said slot is at least as long as said linkage arm.

19. The apparatus of claim 1 wherein said linkage arm is telescopic.

20. The apparatus of claim 19 wherein said linkage arm has first and second telescopic sections, and wherein said first telescopic section is pivotably mounted to said slide-out mounting frame, and said second telescopic section is pivotably mounted to said vehicle mounting frame and wherein said first and second telescopic sections are telescopically mounted to one another.

21. The apparatus of claim 20 wherein said first telescopic section includes at least one cam follower and wherein said second telescopic section includes a cammed slot, and wherein said cam follower is slidably mounted in said cammed slot.

22. The apparatus of claim 21 wherein said at least one cam follower is adapted to maintain said first and second telescopic sections linearly aligned relative to one another during telescopic movement of said first telescopic section relative to said second telescopic section.

23. The apparatus of claim 22 wherein said at least one cam follower is a plurality of said cam followers.

24. The apparatus of claim 22 wherein said drive motor is mounted to said vehicle mounting frame and to a base end of said second telescopic section.

25. The apparatus of claim 20 wherein said arc is substantially 90 degrees.

* * * * *